Jan. 1, 1952     P. G. BROWER     2,581,073
APRON CONTROL FOR EARTH MOVING
APPARATUS OF THE CARRY TYPE
Filed May 27, 1949     3 Sheets-Sheet 1
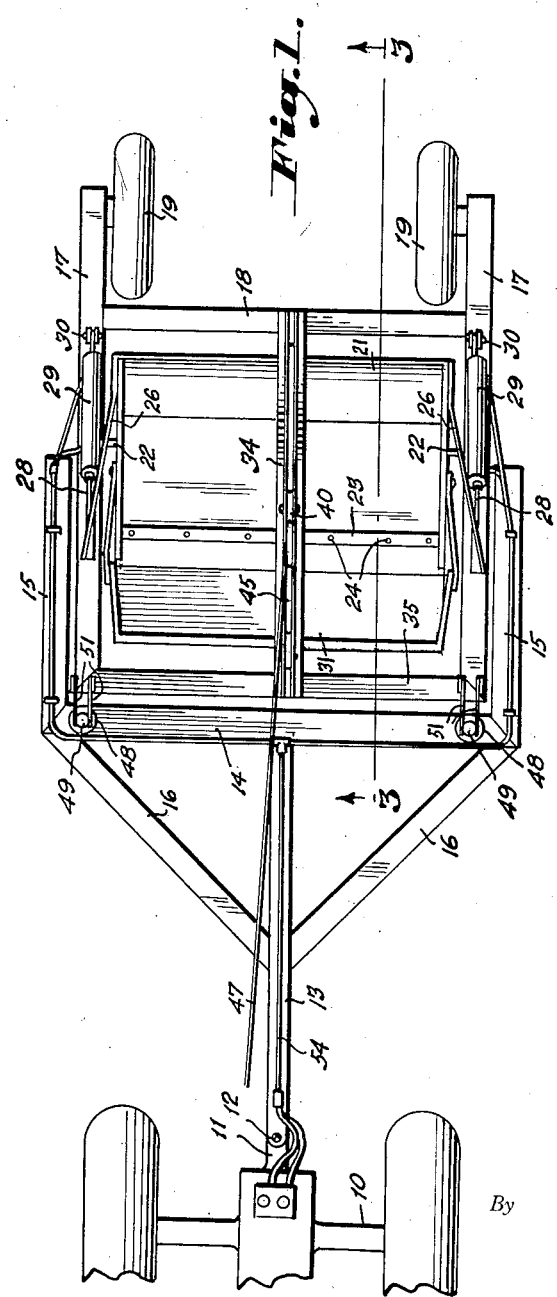
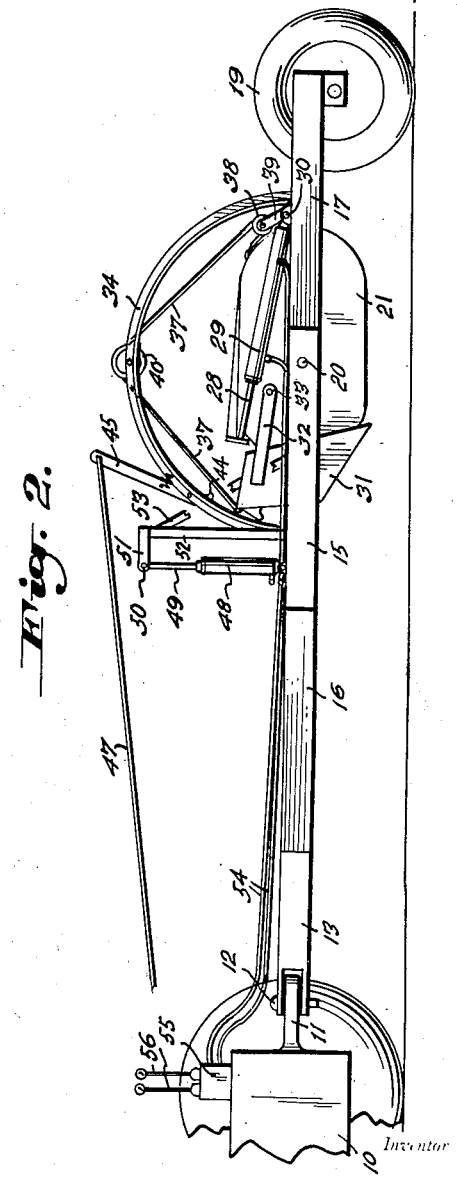
Paul G. Brower
By Patrick J. Beavers
*Attorney*

Inventor
Paul G. Brower
By Patrick D. Beavers
Attorney

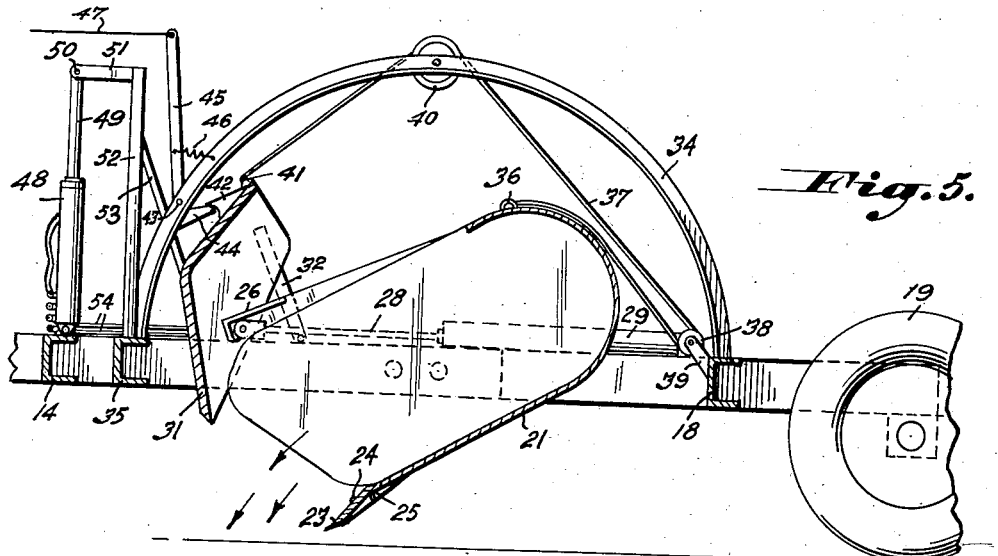
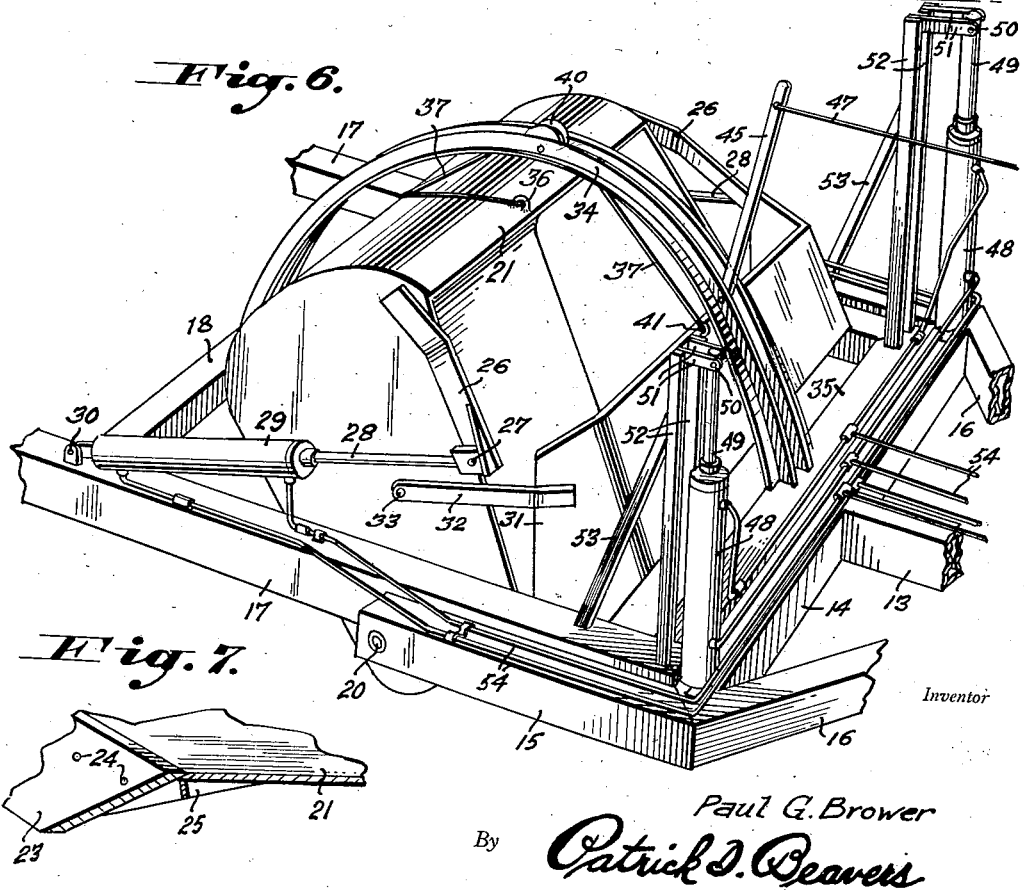

Patented Jan. 1, 1952

2,581,073

UNITED STATES PATENT OFFICE 2,581,073

APRON CONTROL FOR EARTH MOVING APPARATUS OF THE CARRY TYPE

Paul G. Brower, Toppenish, Wash.

Application May 27, 1949, Serial No. 95,836

1 Claim. (Cl. 37—129)

The present invention relates to earth moving apparatus and it consists in the combinations, constructions and arrangements of parts herein described and claimed.

Generally the apparatus comprising the present invention consists of a wheeled frame adapted to be drawn by a tractor and having pivotally connected side arms whereby the cutting blades of a bracket carried by the frame may be raised and lowered with respect to the ground. Novel means is provided for dumping the contents of the bucket. A gate is provided for the bucket and novel means is provided for raising and lowering the gate and a novel latch mechanism is also provided for holding the gate in upraised position during the filling operation for the bucket. Remotely controlled hydraulic means is provided for moving the various parts of the apparatus.

It is accordingly an object of the invention to provide an apparatus of the character set forth which is simple in construction and operation and yet effective and efficient in use.

Another object of the invention is the provision of novel means for raising and lowering a bucket forming a part of the invention.

A further object of the invention is the provision of novel means for raising and lowering an end gate forming a part of the invention.

A further object of the invention is the provision of novel latching means for an end gate forming a part of the invention.

Other and further objects of the invention will become apparent from a reading of the following specification taken in conjunction with the drawings, in which:

Figure 1 is a plan view of an embodiment of the invention,

Figure 2 is a side elevational view thereof,

Figure 5 is a view similar to Figure 3 and Figure 4 but showing the apparatus in dumping position, Figure 6 is a fragmentary perspective view of the apparatus, and Figure 7 is a fragmentary perspective view illustrating certain details of construction.

Figure 3:
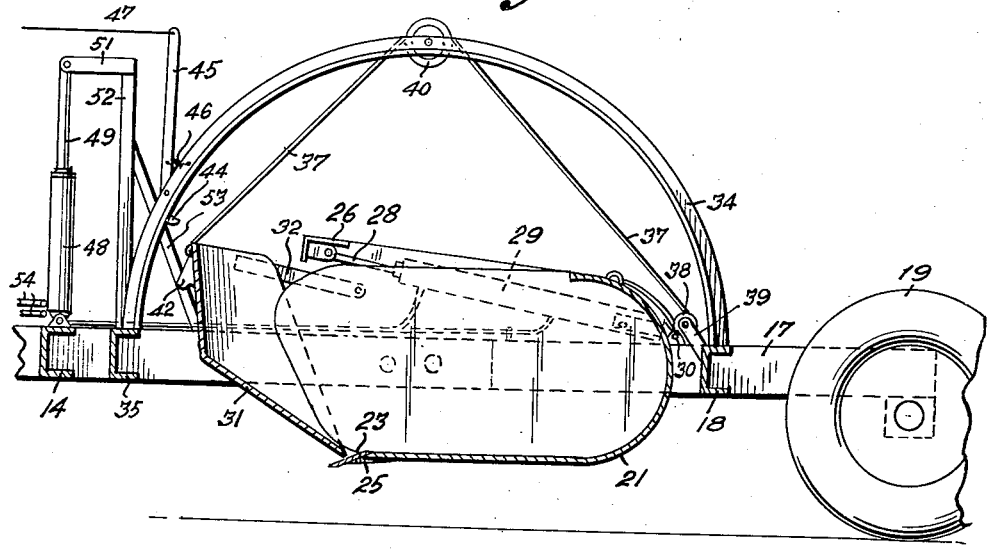
Figure 3 is a sectional view taken along line 3—3 of Figure 1.

Referring more particularly to the drawings, there is shown therein a portion of tractor 10 having a rearwardly extending tongue 11 to which is connected by means of a pin 12, a draw bar 13 which extends forwardly from a U-shaped yoke 14 having rearwardly extending arms 15. Brace members 16 interconnect the yoke 14 with the draw bar 13.

A horizontally extending frame member is provided and consists of side bars 17 and a cross bar 18. Supporting wheels 19 are mounted at the rear ends of the side bars 17.

The side bars 17 are pivotally connected with the arms 15 of the yoke, as indicated at 20.

A scoop 21 extends transversely between the side bars 17 and is revoluble upon stub axles 22. The scoop is open at its forward end and is provided with a transversely extending cutting blade 23 which is reversible and which is connected to the scoop by means of bolts 24 or the like and which is further provided with reinforcement plates 25 affixed to the underside of the scoop.

A downwardly and forwardly extending arm 26 is affixed to the upper end of each side of the scoop and each of the arms 26 has its free end pivotally connected, as indicated at 27, to the outer end of a rod 28 of a hydraulic cylinder 29 which is, in turn, pivotally connected, as shown at 30, to the side bar 17.

An end gate 31 is provided with a pair of rearwardly extending arms 32 which are pivotally connected at their rear ends, as indicated at 33, to the sides of the scoop 21.

A semi-circular support member 34 interconnects the center of the cross bar 18 and the center of a cross bar 35 which interconnects the forward ends of the side bars 17.

Affixed to the center of the scoop 21 at its top side, as indicated at 36, is one end of a cable 37 which extends rearwardly and is entrained over a pulley 38 which is mounted by means of a bracket 39 upon the cross bar 18. The cable then extends forwardly and upwardly over a pulley 40 which is centrally disposed in the member 34 and then extends forwardly and downwardly to connect with the upper end of the gate 34, as indicated at 41.

The forward upper side of the gate 31 is provided with a latch member 42 and a bell crank lever is pivotally connected, as indicated at 43, to the forward portion of the supports 34 and is provided with a relatively short latch-engaging arm 44 and a relatively long upwardly extending arm 45 which is connected with the support 34 by means of a tension spring 46. An operating cord 47 is connected with the upper end of the arm 45 and extends forwardly to a position convenient to the operator of the tractor 10.

A vertically extending hydraulic cylinder 48 is mounted at either side of the yoke 14 and each is provided with an upwardly extending rod 49 each of which is pivotally connected, as indicated at 50, to forwardly extending arms 51 carried at the upper ends of vertical supports 52 affixed to the forward ends of the side bars 17. Angular brace members 53 are provided for this support 52.

Suitable fluid supply conduits 54 interconnect the cylinders 29 and 48 with a control mechanism 55 mounted upon the tractor 10 and having levers 56 convenient to the operator thereof.

Figure 4:
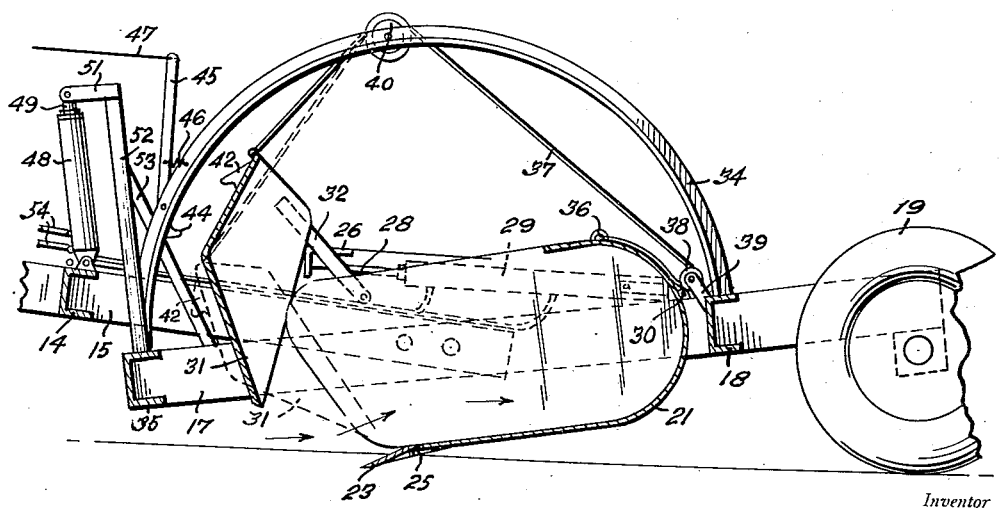
Figure 4 is a view similar to Figure 3 but showing the apparatus in digging position.

In operation, it will be apparent that when it is desired to place the apparatus in digging position, as indicated in Figure 4 in the drawings, it is only necessary to allow the rods 49 to move into the cylinders 48 thereby allowing the forward ends of the side bars 17 to move downwardly and at the same time allow the rearward end of the yoke to move downwardly due to the fact that these members are pivoted at 20. This allows the blade 23 to come into contact with the earth and the forward movement of the apparatus will force the earth to move into the scoop 21.

By forcing the rods 49 outwardly of the cylinders 48 the apparatus will be returned to carrying position as shown in Figure 3 of the drawings.

It will also be seen that as the scoop moves downwardly to digging position that the gate 31 will be moved away from the scoop due to the cable connection 37 and that return of the apparatus to its normal horizontal position will likewise return the gate 31 to a position where it covers the forward open end of the scoop 21.

When it is desired to dump the load carried by the scoop 21, the rods 28 are forced outwardly of the cylinders 29 to thereby tilt the scoop upon the stub axles 22. This action causes the forward end of the cable 37 to move upwardly thereby lifting the gate 31 until the latch member 42 engages the arm 44. When the operator wishes to allow the gate 31 again to assume its normal position, it is only necessary for him to pull the cord 47 forwardly thereby moving the arm 44 out of engagement with the latch member 42.

While but one form of the invention has been shown and described herein, it will be readily apparent to those skilled in the art that many minor modifications may be made without departing from the spirit of the invention or the scope of the appended claim.

What is claimed is:

An apparatus of the character described comprising a wheeled frame, a yoke pivotally connected with said frame, a scoop pivotally connected to the frame, a gate pivotally connected to the scoop, remotely controlled hydraulic means for vertically moving the pivotal connection between the frame and the yoke and automatic means for lifting the gate when the scoop is lowered, said means including an inverted semicircular shaped support centrally affixed to the frame and extending over said gate and scoop, a pulley carried at the upper end of said support, a pulley carried by the frame adjacent the rear end of said support, and a cable interconnecting the upper end of said scoop with the upper end of said gate and entrained over both of said pulleys.

PAUL G. BROWER.

REFERENCES CITED

The following references are of record in the file of this patent:

UNITED STATES PATENTS

| Number | Name | Date |
| --- | --- | --- |
| 1,966,741 | Smith | July 17, 1934 |
| 2,159,045 | Paulsen et al. | May 23, 1939 |
| 2,255,062 | Johnson | Sept. 9, 1941 |
| 2,386,192 | Brimhall | Oct. 9, 1945 |
| 2,445,260 | Brimhall | July 13, 1948 |